United States Patent [19]

Kanao

[11] 4,140,154
[45] Feb. 20, 1979

[54] FLEXIBLE HOSE

[76] Inventor: Shiro Kanao, 32-460, Nanpeidai, Takatsuki-ski, Osaka-fu, Japan

[21] Appl. No.: 791,748

[22] Filed: Apr. 28, 1977

[30] Foreign Application Priority Data

May 13, 1976 [JP] Japan ................................. 51-54881
May 14, 1976 [JP] Japan ................................. 51-55606

[51] Int. Cl.$^2$ ......................................... F16L 11/08
[52] U.S. Cl. ................................. 138/132; 138/122; 138/174
[58] Field of Search ............... 138/121, 122, 137, 138, 138/133, 174, 132, 124, 125, 126, 127, 134

[56] References Cited

U.S. PATENT DOCUMENTS

| 992,426 | 5/1911 | James | 138/122 X |
|---|---|---|---|
| 2,740,427 | 4/1956 | Swan | 138/122 |
| 2,879,804 | 3/1959 | Hammond | 138/138 |
| 3,169,552 | 2/1965 | Fawick | 138/174 X |
| 3,299,908 | 1/1967 | Petzetatis | 138/122 |
| 3,300,571 | 1/1967 | Downey et al. | 174/47 |
| 3,349,806 | 10/1967 | Roberts | 138/174 X |
| 3,502,527 | 3/1970 | Borden | 138/122 X |
| 3,831,890 | 8/1974 | Tolliver | 138/174 X |
| 3,861,424 | 1/1975 | Mizutani et al. | 138/122 X |
| 3,919,026 | 11/1975 | Mizutani et al. | 138/122 X |
| 3,933,554 | 1/1976 | Torghele | 138/138 X |

FOREIGN PATENT DOCUMENTS

| 1191035 | 10/1959 | France | 138/126 |
|---|---|---|---|
| 1019370 | 2/1966 | United Kingdom | 138/122 |

Primary Examiner—Richard E. Aegerter
Assistant Examiner—James E. Bryant, III
Attorney, Agent, or Firm—Edwin E. Greigg

[57] ABSTRACT

A flexible hose comprising a soft hose main body, first helical rigid reinforcing means embedded partially or wholly in the soft hose main body and having a large cross sectional area, and second helical rigid reinforcing means embedded in the wall of the soft hose main body and having a smaller cross sectional area than the first helical rigid reinforcing means. The combination of the reinforcing means having different cross sectional areas gives the hose sufficient flexibility and strength against flattening and against pressure.

4 Claims, 26 Drawing Figures

FLEXIBLE HOSE

BACKGROUND OF THE INVENTION

This invention relates to flexible hoses having a soft hose main body and helical rigid reinforcing means embedded partially or wholly in the wall of the main body.

With flexible hoses of this type, the helical pitch and cross sectional area of the helical rigid reinforcing means closely relate to the flexibility of the hose and its strength against flattening and against pressure. The larger the helical pitch of the reinforcing means, the larger is the width of the soft wall portion between the adjacent coils of the reinforcing means in the axial direction of the hose and the higher will be the flexibility of the hose, whereas the strength against flattening and the pressure resistant strength decrease with an increase in the helical pitch. Accordingly, the alterations of the helical pitch give a conflicting relation between the flexibility and the strength against flattening and pressure. Further as the cross sectional area of the reinforcing means increases, the reinforcing means has increasing bending strength, imparting to the hose enhanced strength against flattening but reduced flexibility. Variations in the cross sectional area of the reinforcing means therefore similarly give a contradictory relation between the flexibility and the strength against flattening and pressure.

Thus, the flexibility, strength against flattening and strength against pressure of the hose depend heavily on the helical pitch and cross sectional area of the reinforcing means.

In view of these characteristics, the flexible hoses of this invention have been developed.

SUMMARY OF THE INVENTION

An object of this invention is to provide flexible hoses which are outstanding in strength against flattening and against pressure although having sufficient flexibility.

Another object of this invention is to provide flexible hoses having the above-mentioned advantages at low costs.

Other objects and advantages of this invention will become apparent from the following description.

To fulfil the foregoing objects, the flexible hose of this invention comprises a soft hose main body, first helical rigid reinforcing means embedded partially or wholly in the soft hose main body and having a large cross sectional area, and second helical rigid reinforcing means embedded in the wall of the soft hose main body and having a smaller cross sectional area than the first helical rigid reinforcing means.

According to this invention, two kinds of helical rigid reinforcing means are used which have different cross sectional areas. The first helical rigid reinforcing means of large cross sectional area and high bending strength mainly assures strength against flattening, and the second helical rigid reinforcing means of smaller cross section, which does not substantially impair the flexibility of the hose despite the small helical pitch or spacing of its coils, imparts satisfactory pressure resistant strength to the wall portions of the soft main body between the adjacent coils of the first helical rigid reinforcing means of large cross sectional area. Consequently, as compared with a structure incorporating reinforcing means of small cross sectional area only, the hose of this invention has superior strength against flattening and pressure, if involving an equivalent helical pitch to ensure satisfactory flexibility. Further as compared with a structure wherein reinforcing means of large cross sectional area alone is used, equivalent strength against flattening and pressure can be given to the hose of this invention with an increased helical pitch which ensures satisfactory flexibility, eventually permitting the hose to have greatly increased strength against pressure.

BRIEF DESCRIPTION OF THE DRAWINGS

The drawings illustrate flexible hoses embodying this invention.

DESCRIPTION OF THE PREFERRED EMBODIMENTS

Figure 1:
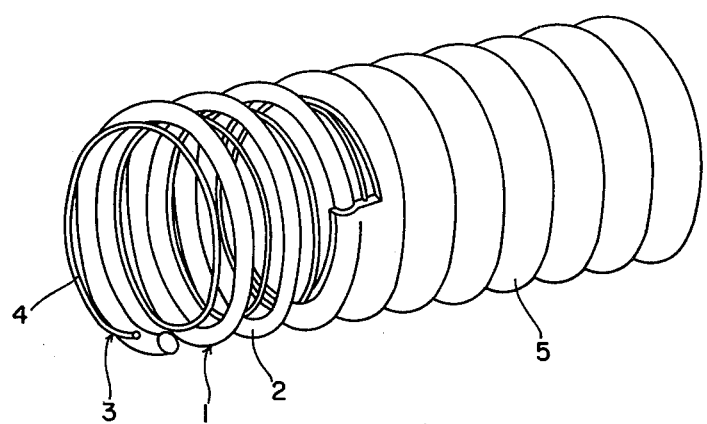
FIG. 1 is a perspective view partly broken away and showing an embodiment.

Embodiments of this invention will be described below with reference to the drawings. Throughout the drawings like parts are referred to by like reference numerals.

Figure 2:
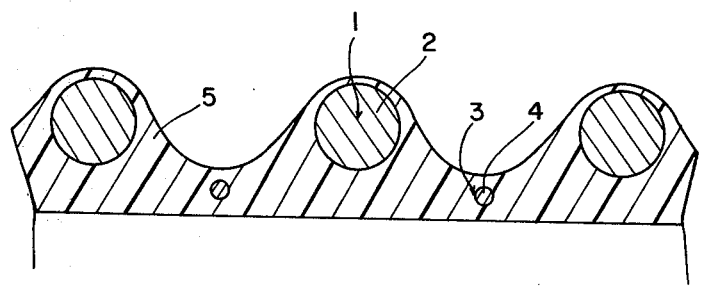
FIG. 2 is an enlarged side elevation in vertical section showing the main part of FIG. 1.

Indicated at 1 in FIGS. 1 and 2 is first helical rigid reinforcing means (hereinafter referred to as "the first reinforcing means") having a circular cross section of large area. The first reinforcing means 1 comprises a single helical rigid reinforcement 2 made of rigid polyvinyl chloride resin. Indicated at 3 is second helical rigid reinforcing means (hereinafter referred to as "the second reinforcing means") wound in the axial direction of the hose with each turn or coil thereof positioned between the adjacent coils of the first reinforcing means 1. The second reinforcing means 3 comprises a single helical rigid reinforcement 4. A piano wire is used as the reinforcement 4. The second reinforcing means 3 has a smaller cross sectional area than the first reinforcing means 1 and is wound at the same helical pitch as the first reinforcing means 1. A soft hose main body 5 forms the tubular wall of the hose continuously extending axially of the hose and has the reinforcing means 1 and 3 embedded therein. The soft hose main body 5 is made of soft polyvinyl chloride resin.

Figure 3:
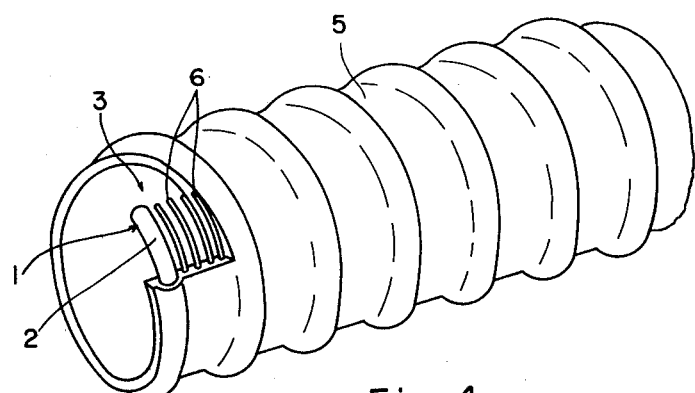
FIG. 3 is a perspective view partly broken away and showing another embodiment.
Figure 4:
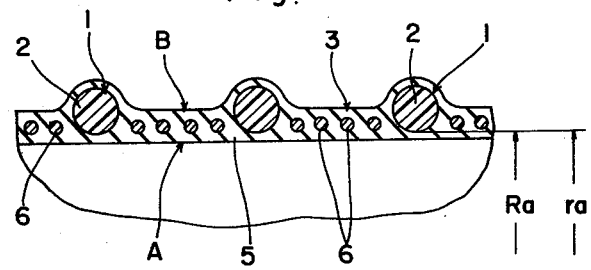
FIG. 4 is an enlarged side elevation in vertical section showing the main part of FIG. 3.

With the embodiment shown in FIGS. 3 and 4, the second reinforcing means 3 comprises helical rigid reinforcements 6, which are piano wires, wound helically in the axial direction of the hose, with a plurality of coils thereof positioned between the adjacent coils of the first reinforcing means 1. The helical peripheries of the reinforcements 2 and 6 respectively have diameters Ra and ra which are equal. The soft main body 5 of the hose has inner and outer peripheral surfaces A and B which are formed along imaginary circular surfaces in which the inner helical peripheries and outer helical peripheries of the reinforcements 2 and 6 are positioned. The second reinforcing means 3 comprising a plurality of helical rigid reinforcements 6 can be modified variously as will be described below with reference to FIGS. 5 to 11.

Figure 5:
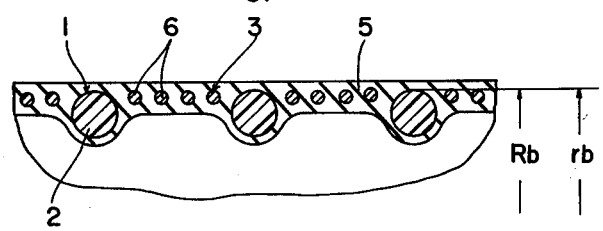
FIGS. 5 to 11 are enlarged side elevations in vertical section showing other different embodiments respectively, each of the views illustrating the main part.
Figure 6:
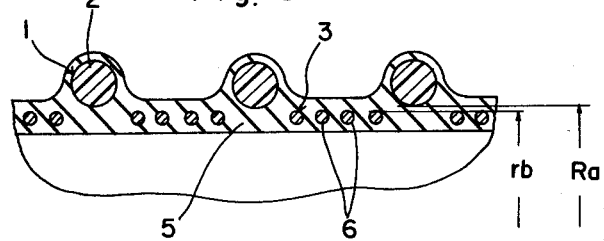
Figure 7:
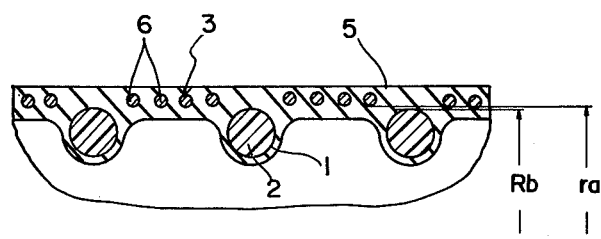
Figure 8:
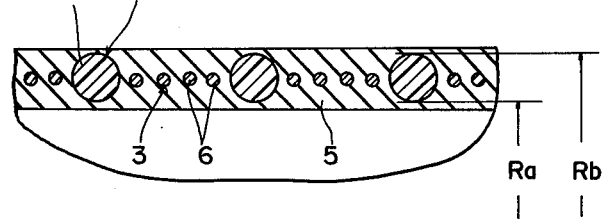
Figure 9:
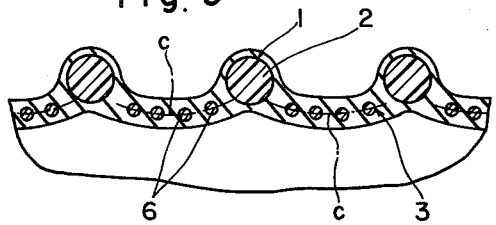
Figure 10:
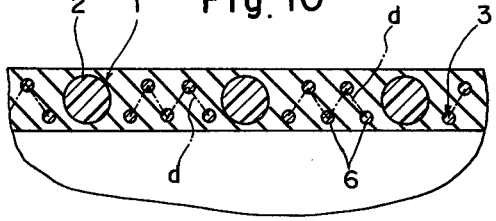

FIG. 5 shows an embodiment wherein the outer helical peripheries of the reinforcements 2 and 6 have diameters Rb and rb which are equal. FIG. 6 shows another embodiment wherein the outer helical peripheries of the reinforcements 6 of smaller cross sectional area have a diameter rb which is smaller than or equal to the diameter Ra of the inner helical periphery of the reinforcement 2 of large cross sectional area. FIG. 7 shows another embodiment wherein the inner helical peripheries of the reinforcements 6 of smaller cross sectional area have a diameter ra larger than or equal to the diameter Rb of the outer helical periphery of the reinforcement 2 of large cross sectional area. FIG. 8 shows another embodiment wherein the reinforcements 6 of smaller cross sectional area are positioned between imaginary circular surfaces Ra and Rb in which the inner and outer helical periphries of the reinforcement 2 of large cross section are positioned respectively. FIG. 9 shows an embodiment wherein the reinforcements 6 of smaller cross sectional area are positioned along an imaginary circular surface c which is curved inward radially of the hose between adjacent coils of the reinforcement 2 of large cross sectional area. FIG. 10 shows an embodiment wherein the reinforcements 6 of small cross sectional area are positioned along an imaginary circular zigzag surface d axially of the hose.

With hoses of such a construction that the reinforcements 2 and 6 are embedded in and bound together by the soft hose main body 5, the soft hose main body 5 may have the same wall thickness in axial direction of the hose as seen in FIGS. 9 and 10.

Figure 11:
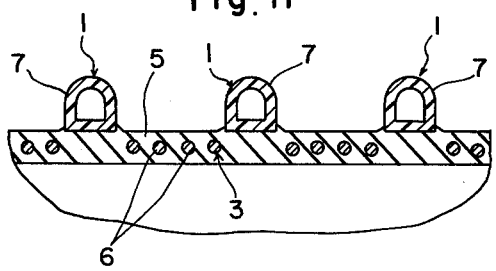

FIG. 11 shows another embodiment of this invention comprising reinforcements 6 of small cross sectional area embedded in a tubular soft hose main body 5, and a tubular reinforcement 7 serving as the first reinforcing means 1 of large cross section, the reinforcement 7 being embedded slightly in and adhered to the outer peripheral surface of the tubular soft hose main body 5, whereby both the reinforcements 6 and 7 are bound together. The reinforcement 7 of large cross sectional area may have any of various cross sectional shape such as an inverted U-shape as seen in FIG. 11. Instead of metal materials such as piano wire, synthetic resin materials are usable for the reinforcement 6 of small cross sectional area.

As will be apparent from the detailed description given above, the cross sectional areas of the first and second reinforcing means 1 and 3 are the areas surrounded by the contours of the reinforcing means 1 and 3 in cross section. For instance, when the reinforcement 2, 4 or 7 constituting such reinforcing means has a hollow structure, the cross sectional area thereof is the sum of the cross sectional area of the reinforcement and that of the hollow portion.

To fulfil the objects of this invention, the invention further provides flexible hoses having improved flexibility and increased strength against flattening and against pressure, the hoses being characterized by the structure to be described below in detail in which flexible tough fibers extend axially of the hose to connect the second reinforcing means together. With hoses incorporating the flexible tough fibers, the first reinforcing means of large cross sectional area affords strength against flattening, and the second reinforcing means of small cross section and the fibers give pressure resistant strength to the soft wall portions between the adjacent coils of the first reinforcing means while ensuring outstanding flexibility.

Figure 12:
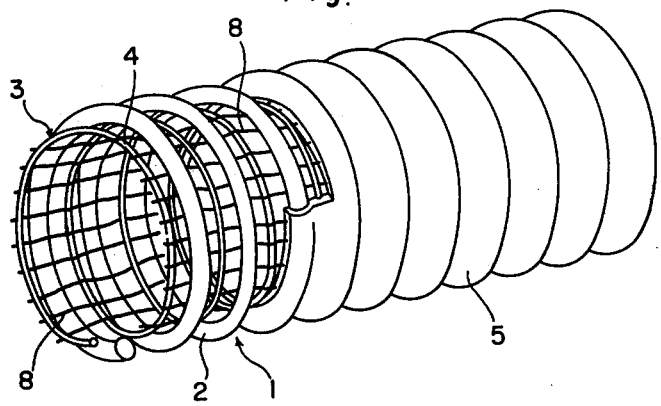
FIG. 12 is a perspective view partly broken away to show another embodiment.
Figure 13:
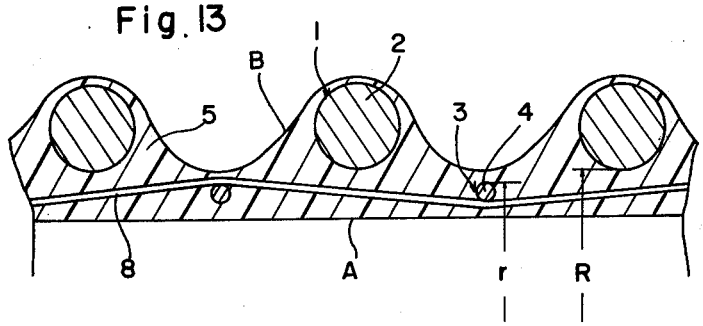
FIG. 13 is an enlarged side elevation in vertical section showing the main part of FIG. 12.
Figure 14:
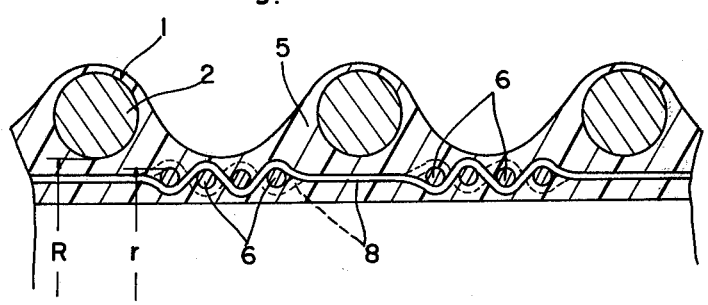
FIGS. 14 to 26 are enlarged side elevations in vertical section showing other different embodiments respectively, each of the views illustrating the main part.

FIGS. 12 and 13 show first reinforcing means 1 comprising a helical solid rigid reinforcement 2 made of rigid polyvinyl chloride resin and having a circular cross section of large area. Second reinforcing means 3 provided between the adjacent coils of the first reinforcing means 1 comprises a single reinforcement 4 helically wound at the same pitch as the first reinforcing means 1 and having a smaller cross sectional area. A piano wire is used as the reinforcement 4. Flexible tough fibers 8 arranged at a plurality of positions circumferentially of the hose extend axially of the hose across the coils of the second reinforcing means 3 of small cross section spaced apart axially of the hose. The fibers 8 are in contact with or adhered to the inner peripheries and the outer peripheries of the coils alternately in the axial direction of the hose and connect the coils together. The reinforcing means 1 and 3 and the fibers 8 are wholly embedded in and thereby bound together by a soft hose main body 5 made of soft polyvinyl chloride resin and forming the wall of the hose continuously extending axially thereof. The outer helical periphery of the reinforcement 4 of small cross sectional area has a diameter r which is slightly smaller than the diameter R of the inner helical peripheral surface A of the hose having the same diameter in the axial direction of the hose. The outer peripheral surface B of the hose extends in a zigzag fashion along an imaginary surface which interconnects the outer helical peripheral surfaces of the reinforcements 2 and 4.

The second reinforcing means 3 of the flexible hose described above may comprise a plurality of reinforcements 6 of small cross sectional area which are wound helically in the axial direction of the hose as will be described below with reference to FIGS. 14 to 26.

Figure 15:
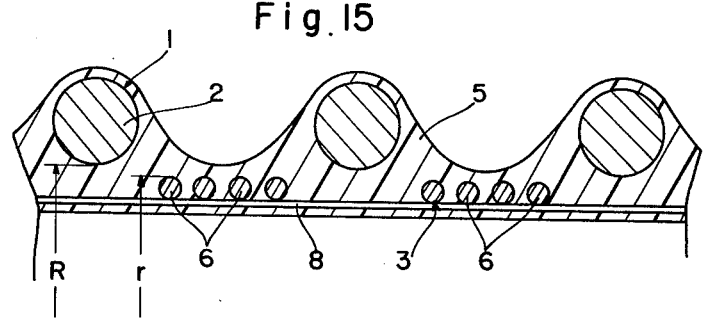
Figure 16:
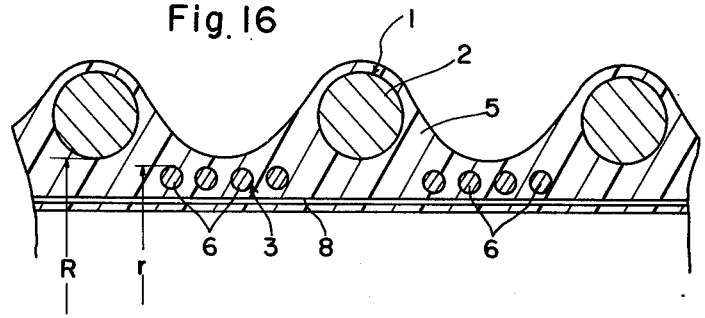
Figure 17:
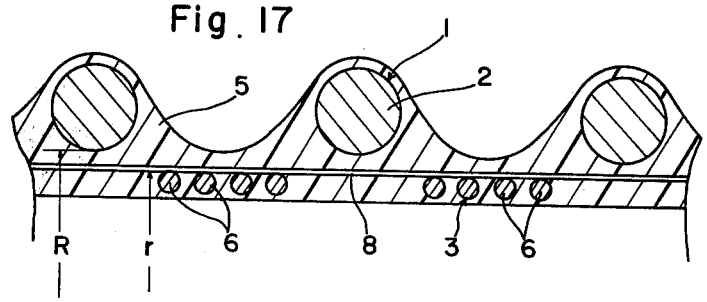
Figure 18:
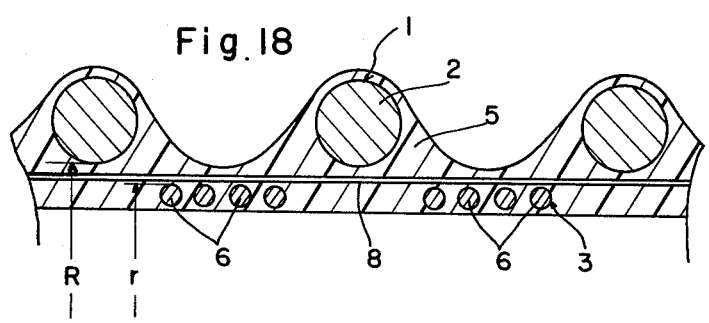
Figure 19:
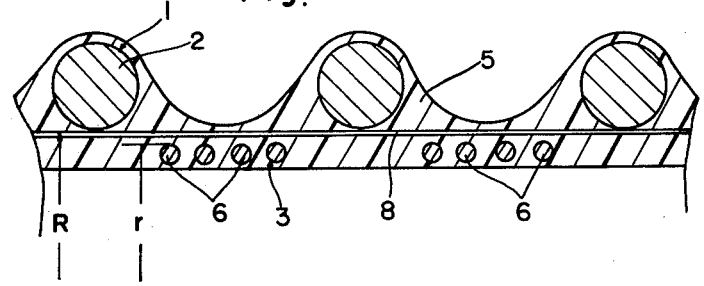
Figure 20:
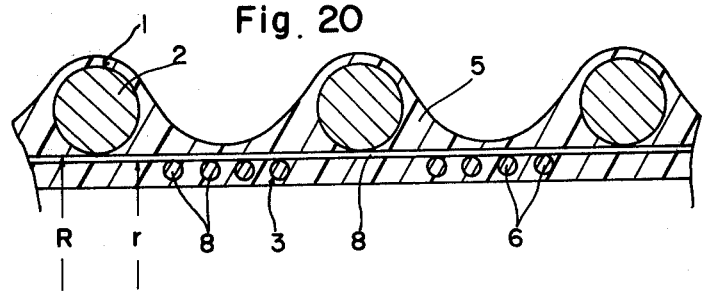

FIGS. 14 to 21 show embodiments wherein the outer helical peripheries of the plurality of reinforcements 6 have the same diameter r which is slightly smaller than the diameter R of the inner helical periphery of the reinforcement 2 of large cross sectional area. The embodiment shown in FIG. 14 incorporates the coils of reinforcements 6 of small cross sectional area and fibers 8 intersecting each other to provide a plain weave. FIG. 15 shows another embodiment in which fibers 8 are provided in contact with the inner peripheries of the coils of reinforcements 6 of small cross sectional area. FIG. 16 shows another embodiment in which fibers 8 are positioned toward the hose axis inwardly from the coils of reinforcements 6 of small cross sectional area and are connected indirectly to the coils by the soft hose main body 5. FIG. 17 shows another embodiment in which fibers 8 are provided in contact with the outer peripheries of the coils of reinforcements 6 of small cross sectional area. FIG. 18 shows another embodiment in which fibers 8 are provided between reinforcements 2 and 6 and connected indirectly to the reinforcements 6 of small cross sectional area by the soft hose main body 5. FIG. 19 shows a modification of the embodiment of FIG. 18 in which the fibers 8 are positioned in contact with the inner helical periphery of the reinforcement 2 of large cross section area. FIG. 20 shows another modification of the embodiment of FIG. 18 in which the fibers 8 are provided in contact with both the reinforcements 2 and 6.

Figure 21:
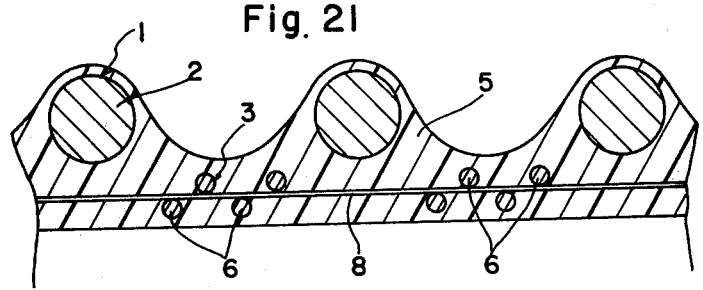

FIG. 21 shows another embodiment in which fibers 8 are positioned in contact with the inner peripheries and outer peripheries of the coils of reinforcements 6 without being bent, with the coils of the reinforcements 6 arranged along an imaginary zigzag surface extending in the axial direction of the hose.

Figure 22:
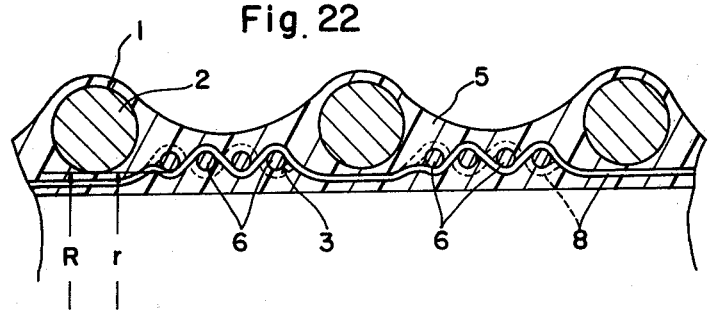
Figure 23:
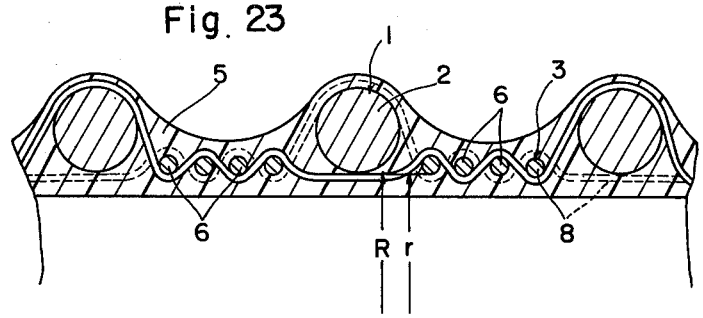
Figure 24:
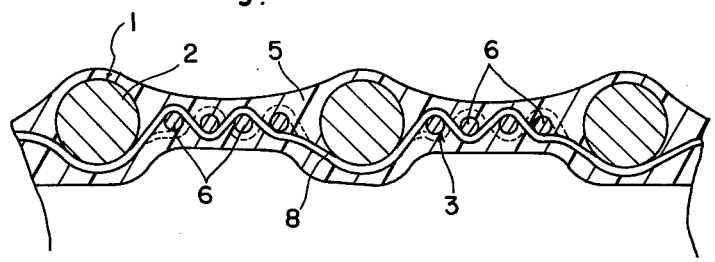

FIG. 22 shows another embodiment in which the coils of reinforcements 6 of smaller cross sectional area have inner peripheries having a diameter r which is equal to the diameter R of the inner helical periphery of reinforcement 2 of large cross sectional area 2, the coils of the reinforcements 6 and fibers 8 intersecting each other to provide a plain weave. FIG. 23 shows a modification of the embodiment of FIG. 22 in which the fibers 8 further intersect the reinforcement 2 of large cross sectional area in a plain weave arrangement. FIG. 24 shows another embodiment in which reinforcements 6 of small cross sectional area are positioned intermediately between the inner and outer helical peripheries of the reinforcement 2 of large cross sectional area, the coils of the reinforcements 6 and fibers 8 being so arranged as to form a plain weave.

Figure 25:
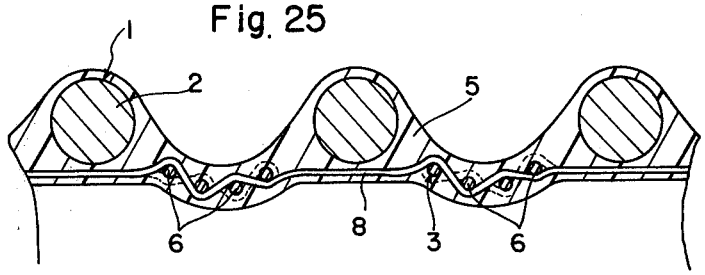

FIG. 25 shows another embodiment in which the coils of reinforcements 6 of small cross sectional area provided between the adjacent coils of reinforcement 2 of large cross sectional area are arranged along an imaginary circular surface which is inwardly curved toward the hose axis, the coils of the reinforcements 6 and fibers 8 being so arranged as to form a plain weave.

Figure 26:
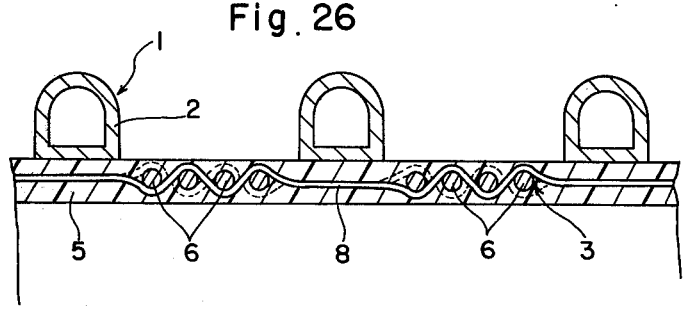

FIG. 26 shows an embodiment comprising reinforcements 6 of small cross sectional area embedded in a soft hose main body 5 and a reinforcement 2 of large cross sectional area slightly embedded in and adhered to the outer peripheral surface of the soft hose main body 5. The reinforcement 2 may have an inverted U-shaped cross section which may be hollow as seen in FIG. 26.

The reinforcement 6 of small cross sectional area may be made of metal material such as piano wire, rigid synthetic resin or the like.

What is claimed is:

1. A flexible hose comprising:
    a soft hose main body;
    first helical rigid reinforcing means comprising a single helical reinforcement embedded at least partially in said soft hose main body;
    second helical rigid reinforcing means embedded in the wall of said soft hose main body between adjacent coils of said first helical rigid reinforcing means, said second helical rigid reinforcing means having the same helical pitch as, but a smaller cross-sectional area than said first helical rigid reinforcing means; and
    a plurality of flexible tough fibers embedded in the wall of said soft hose main body in parallel with the axis thereof to connect the coils of said second helical rigid reinforcing means, the outer helical periphery of said second helical rigid reinforcing means having a diameter smaller than the diameter of the inner helical periphery of said first helical reinforcing means.

2. A flexible hose as defined in claim 1 wherein said second helical rigid reinforcing means comprises a single helical reinforcement wound helically in the axial direction of the hose.

3. A flexible hose as defined in claim 2, wherein the second helical rigid reinforcing means comprises a plurality of helical reinforcements wound helically in the axial direction of the hose.

4. A flexible hose as defined in claim 1 wherein said hose main body is formed of soft polyvinyl chloride resin, said first helical rigid reinforcing means is formed of rigid polyvinyl chloride resin, and said second helical rigid reinforcing means comprises piano wire.

* * * * *